Jan. 22, 1957 P. S. T. BUCKERFIELD 2,778,883

PARALLEL AMPLIFYING SYSTEM

Filed Feb. 13, 1953

Inventor:
Philip S.T. Buckerfield,
by Charles M. Hutchins
His Attorney.

2,778,883
Patented Jan. 22, 1957

2,778,883

PARALLEL AMPLIFYING SYSTEM

Philip S. T. Buckerfield, Kilsby, Rugby, England, assignor to The British Thomson-Houston Company Limited, a British company Application February 13, 1953, Serial No. 336,859

3 Claims. (Cl. 179—171)

The present invention relates in general to improvements in amplifiers and in particular to improvements in direct coupled amplifiers such as may be used, for instance, in electro-biological measurements, for driving the pens of high-speed recorders, D. C. analogue computing systems and the like.

Direct coupled amplifiers of the type referred to above suffer from instability in amplification due to drifting of anode current therein brought about by variations in the operating voltage for the amplifiers and in the emission of the electron discharge devices used in such amplifier circuits. Previous attempts to overcome these adverse features have resulted in a limitation of the pass-band of the amplifier and in the production of substantial phase shift by the amplifier. One such amplifier, usually termed a modulated amplifier, converts the unidirectional input voltage to alternating voltage and reconverts the alternating voltage after amplification to unidirectional voltage. This arrangement tends to limit the frequency of amplification to about one tenth the frequency of the aforementioned alternating voltage. The response of such an amplifier would make it unsuitable for use in a high-speed servo system, for example.

Accordingly, it is an object of the present invention to provide a high-gain amplifier of the character described which is stable and which will pass a wide pass-band of frequencies without introducing appreciable phase-shift in the process.

It is also an object of the present invention to provide a highly stable amplifier which will amplify unidirectional voltages as well as low-frequency alternating voltages.

It is another object of the present invention to provide an amplifying system which will amplify waves extending over a broad band of frequencies without causing appreciable phase shift in the amplified waves with respect to the applied waves.

It is a further object of the present invention to provide an amplifier which will amplify both unidirectional and alternating voltages with substantial uniformity and without altering appreciably the phase of said voltages in the process.

Figures 1, 2:
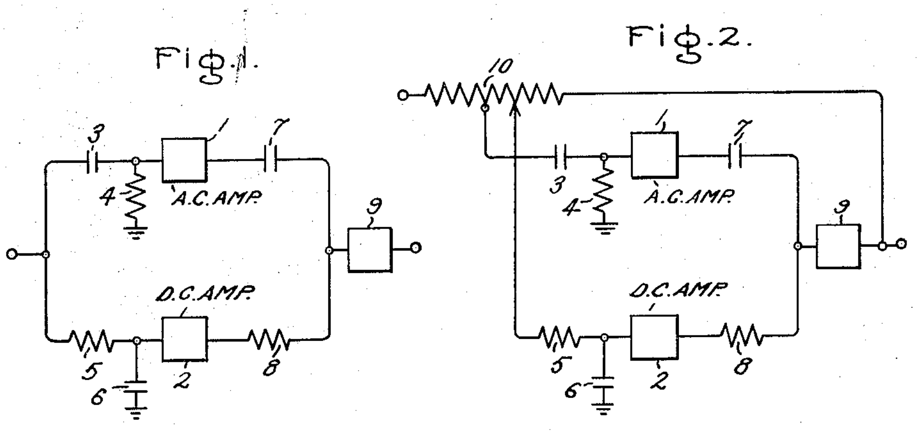
Figure 3:
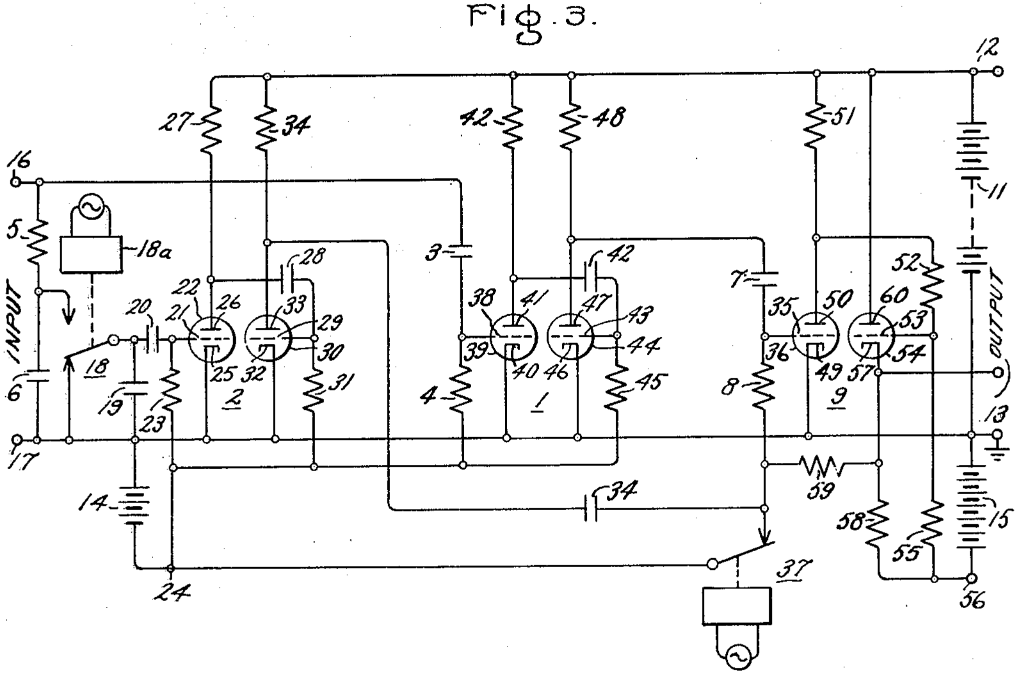

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a block diagram of a combination of a modulated D. C. amplifier and a capacitor coupled A. C. amplifier in accordance with my invention;

Fig. 2 is a schematic diagram of an arrangement similar to that shown in Fig. 1 in which is included a negative feed-back loop; and Fig. 3 is a schematic diagram of the amplifier shown in the block diagram of Fig. 1.

For one aspect of the present invention, reference is made to Fig. 1 wherein is shown a pair of amplifiers 1 and 2, one an amplifier of alternating voltages and the other an amplifier of unidirectional voltages. Signals to be amplified are applied to the alternating amplifier 1 through a high pass network which includes a capacitance 3 and resistance 4 connected in series and the signals are applied to the unidirectional amplifier 2 through a low pass network which includes resistance 5 and capacitance 6 connected in series. The outputs of the amplifiers 1 and 2 are applied through another network which includes a capacitance 7 and resistance 8 connected in series between amplifier 1 and amplifier 2. The output appearing at the junction of capacitance 7 and resistance 8 is applied to the amplifier 9 which may, for example, be a stabilized direct coupled amplifier.

The network comprising resistance and capacitance elements 3, 4, 5, 6, 7, and 8 are arranged and proportioned substantially in the manner they would be in the well-known parallel-T-type filter to have the characteristic of passing all except a certain rejection band of frequencies without appreciable phase shift. In a parallel-T filter, the series resistance branches 5 and 8 would be connected between an input and an output terminal. The series capacitance branches 3 and 7 would also be connected between these input and output terminals. The capacitance 6 would be connected between the junction of resistances 5, 8 and common input and output terminal which may be at ground potential. The resistance 4 would be connected between the junction of capacitances 3 and 7 and the common input and output terminal. When the resistances and capacitances of the network are proportioned substantially so that:

Resistance 5=resistance 8
Capacitance 3=capacitance 7
Capacitance 6=two times capacitance 3
Resistance 4=one-half of resistance 5 the transmission characteristic of the parallel-T network is such that at the rejection frequency determined by the relationship $$\text{Rejection frequency} = \frac{1}{2\pi \times \text{resistance } 5 \times \text{capacitance } 3}$$

voltage waves applied between the input terminals of the filter are not transmitted to the output terminals thereof. However, at frequencies on either side of the rejection frequency, the transmission of waves increases for increases in departure from the rejection frequency for a narrow band of frequencies. Beyond this band of rejection frequencies the transmission of waves through the filter is substantially uniform. Additionally, the phase shift introduced by the filter in waves applied thereto is inappreciable except in the vicinity of and including the rejection band of frequencies.

The complementary natures, from the point of view of frequency and transient response of the modulated D. C. amplifier channel, with its low-pass characteristic, and the capacitor-coupled A. C. amplifier channel, with its high-pass characteristic, make the parallel combination of the two in the manner shown in Fig. 1 equivalent to a parallel-T filter in series with an amplifier of perfect characteristics. The transfer characteristics of the parallel-T filter may readily be modified to give approximately uniform amplitude and phase response over a frequency range from zero to many kilocycles.

The individual gains of the amplifiers 1 and 2 are matched in order to achieve a flat overall characteristic but the matching is not critical if, as will be usual, overall negative feedback is employed as shown and to be described in connection with Fig. 2. With a ratio of gains between the two channels of as high as 10/1 the phase-shift introduced by the system does not exceed 90°.

Accordingly, low frequency stability is not affected by wide variations in channel gain.

If the parallel-T amplifier as described above in Fig. 1 is required to handle frequencies in the region of the modulator frequency used in certain D. C. amplifiers as pointed out above, there is a danger that spurious D. C. voltages may be developed by rectification of the required signal by both modulator and demodulator of D. C. amplifiers. This objection is overcome by the use of negative feedback as shown in Fig. 2. In this figure is shown an arrangement identical with the arrangement of Fig. 1 with the addition that negative feedback is provided from the output of the amplifier to the input of the low pass network 5, 6 and high pass network 3, 4 through resistance 10 as shown. Negative feedback corrects for nonlinearities introduced in both the high pass and low pass channels of the amplifying system.

Fig. 3 is a schematic representation of the circuits shown in block diagram in Fig. 1. Elements of Fig. 3 corresponding to the elements of Fig. 1 have been assigned the same numerical designations. Low pass filter network 5, 6, amplifier 2 and resistance 8 correspond to the low pass channel of Fig. 1. High pass filter network 3, 4, amplifier 1 and capacitance 7 correspond to the high pass channel of Fig. 1. Outputs from these channels are combined in the amplifier 9 from which the desired output is obtained.

The amplifiers of Fig. 3 are supplied with operating potential from source 11 having a positive terminal 12 and a negative terminal 13 connected to ground. Biasing potentials are obtained from sources 14 and 15.

The signal to be amplified is applied between the input terminals 16, 17, the latter of which is connected to ground, and appears across the low pass filter having a resistance 5 and a capacitance 6 connected in series in the order named between terminals 16 and 17. The signal voltage appearing across the capacitance 6 is converted into an alternating voltage, the envelope of which varies with the variation in the unidirectional potential appearing across the capacitance 6 in the low pass channel to be described. To this end is provided a double pole, single throw switching arrangement 18, the poles of which are connected in shunt with the capacitance 6 and the arm of which is connected to one electrode of capacitance 19, the other electrode of which is connected to ground. The relay arrangement **18*a* functions to periodically oscillate the arm of the switch 18 from one pole to the other thereby developing across the capacitance 19 an alternating voltage the peak amplitude of which varies in accordance with the magnitude of the unidirectional potential appearing across the capacitance 6. The capititor 19 also functions to eliminate arcing at the terminals of the switch 18**.

The voltage appearing across capacitance 19 is applied through coupling capacitor 20 to the grid 21 of the electron discharge device 22. The grid is also connected through grid leak resistance 23 to the negative terminal 25 of source of bias potential 14, the positive terminal of which is connected to ground. The electron discharge device 22 also includes a cathode 25 connected to ground and an anode 26 connected through an anode load resistance 27 to the positive terminal 12 of the source 11. The alternating output appearing at the anode 22 is applied through coupling capacitor 28 to the grid 29 of electron discharge device 30. The grid 29 is also connected through grid leak resistance 31 to negative terminal 24 of bias source 14. The electron discharge device 30 also includes a cathode 32 connected to ground and an anode 33 connected through anode load resistance 34 to positive terminal 12. The output appearing at the anode 33 is applied through coupling capacitor 34 and resistance 8 to the grid 35 of electron discharge device 36. The junction of capacitor 34 and resistance 8 is connected through a relay arrangement 37 to the negative terminal 24 of bias source 14. Contacts of the relay 37 are periodically opened and closed in timed relationship with respect to the operation of the switch 18 to reconvert the alternating voltage into amplified unidirectional voltage.

The signal to be amplified appearing across terminals 16 and 17 is also applied to the high pass channel comprising a capacitance 3 and a resistance 4 connected in series in the order named between the input terminal 16 and the negative terminal 24 of the bias source 14. Junction of the capacitance 3 and the resistance 4 is connected to the grid 38 of electron dischnarge device 39. Device 39 also includes a cathode 40 connected to ground and an anode 41 connected through an anode load resistance 42 to the positive terminal 12. The amplified alternating output appearing at the anode 41 is applied through coupling capacitor 42 to the grid 43 of electron discharge device 44. The grid 43 is also connected through grid leak resistance 45 to the negative terminal 24 of bias source 14. Electron discharge device 44 also includes a cathode 46 connected to ground and an anode 47 connected through anode load resitance 43 to the positive terminal 12 of the unidirectional source 11. The amplified alternating output appearing at the anode 47 is coupled through coupling capacitor 7 to the grid 35 of electron discharge device 36.

Device 36 also includes a cathode 49 connected to ground and an anode 50 connected through anode load resistance 51 to the positive terminal 12. The anode 50 is directly coupled through resistance 52 to the grid 53 of electron discharge device 54 in order to pass unidirectional as well as alternating voltages. The grid 53 is also connected through resistance 55 to the negative terminal 56 of bias source 15, the positive terminal of which is connected to ground. The anode 60 is connected to the positive terminal 12 of the unidirectional source 11. The cathode 57 of device 54 is connected through cathode load resistance 58 to terminal 56. The cathode is also connected through resistance 59 to the junction of capacitance 34 and resistance 8. By means of feedback through resistance 59, an A. C. voltage null is had as desired at the demodulator switch 37 to obtain proper combination of the outputs of the high and low pass channels. Output from amplifier 54 is obtained between the cathode and ground.

The time constants of the network 3, 4, the network 5, 6, and network 7, 8 are proportioned to give adequate overlap of the frequency characteristics of the two channels depending on the uniformity of response desired.

The two stages of the high pass A.-C. channel may be either directly coupled together, to avoid completely phase-shift at low frequency, or capacitor coupling may be used provided the time constant of this coupling is made several times larger than the input time constant of this channel.

The use of capacitive couplings at the input of both channels of the amplifying system effectively isolates the input from the electrodes of the electron discharge devices associated with these channels, thus avoiding contact potential effects associated with these electrodes in producing spurious potential changes exhibiting themselves as a drift of D.-C. zero.

Accordingly, it is seen that an effective and advantageous amplifying system has been provided which will amplify both unidirectional and alternating voltages with substantial uniformity without altering appreciably the phase of said voltages in the process.

While I have shown a particular embodiment of my invention, it will, of course, be understood that I do not wish to be limited thereto since many modifications, both in the circuit arrangement and in the instrumentalities employed, may be made, and I, therefore, contemplate by the appended claims to cover any such modifications as fall within the true spirit and scope of my invention.

What I claim as new and desire to secure by Letters Patent of the United States is:

1. An amplifying system for amplifying both unidirectional and alternating voltages comprising an input terminal, an output terminal, and a common input and output terminal, a first capacitance and resistance connected in series in the order named between said input and said common terminal, a second resistance and capacitance connected in series in the order named between said input and said common terminal, said first capacitance and resistance being proportioned to pass with greater effectiveness the higher frequencies of said voltage, said second resistance and capacitance being proportioned to pass with greater effectiveness the lower frequencies of said alternating voltages, an alternating current amplifier and a direct current amplifier, means for applying the voltages appearing across said first resistance to the input of said alternating current amplifier, means for applying the voltages appearing across said second capacitance to said direct current amplifier, a third capacitance connected to couple the output of said first amplifier to said output terminal, a third resistance connected to couple the output of said second amplifier to said output terminal, said resistances and capacitances being proportioned and arranged to form a pair of T networks arranged in parallel between the input and output of said system with the series resistance branch of one of said networks paralleling the series capacitance branch of the other of said networks, and the shunt capacitance branch of said first T network paralleling the shunt resistance branch of said second T network, said elements being substantially proportioned as they would be in a parallel T filter network to pass substantially uniformly with inappreciable phase shift unidirectional and alternating voltages of frequencies from zero up to the rejection frequency of said filter, whereby said system amplifies uniformly said voltages without appreciably shifting the phase thereof.

2. An amplifying system for amplifying waves extending over a desired broad band of frequencies comprising an input terminal, an output terminal, and a common input and output terminal, a first capacitance and resistance connected in series between said input and said common terminal, a second resistance and capacitance connected in series between said input terminal and said common terminal, said first capacitance and resistance being proportioned to pass with greater effectiveness waves having the higher frequencies in said band, and said second resistance and capacitance being proportioned to pass with greater effectiveness waves having the lower frequencies in said band, a pair of amplifiers, means for applying the waves appearing across said first resistance to the input of one of said amplifiers, means for applying the waves appearing across said second capacitance to the input of the other of said amplifiers, a third capacitance connected to couple the output of said first amplifier to said output terminal, a third resistance connected to couple the output of said second amplifier to said output terminal, means for applying a portion of the output appearing at said output terminals in degenerative phase to the inputs of said networks, said resistances and capacitances being proportioned and arranged to form a pair of T networks arranged in parallel between the input and output of said system with the series resistance branch of one of said networks paralleling the series capacitance branch of the other of said networks and the shunt capacitance branch of said first T network paralleling the shunt resistance branch of said second T network, said elements being substantially proportioned as they would be in a parallel T filter network to pass substantially uniformly with inappreciable phase shift all waves lying outside the rejection band of said parallel T filter, said rejection band of frequencies of said parallel T networks being beyond the desired band of frequencies, whereby said system amplifies uniformly said waves without appreciably shifting the phase thereof.

3. An amplifying system for amplifying both unidirectional and alternating voltages comprising first and second parallel amplifying channels, each having an input and an output terminal and a common input and output terminal, a first capacitance and resistance connected in series in the order named between said input and said common terminal, a second resistance and capacitance connected in series in the order named between said input and said common terminal, said first capacitance and resistance being proportioned to pass with greater effectiveness the higher frequencies of said voltages, said second resistance and capacitance being proportioned to pass with greater effectiveness the lower frequencies of said alternating voltages, means for applying the voltages appearing across said first resistance to the input of said first amplifying channel, means for applying the voltages appearing across said second capacitance to said second amplifying channel, means in said second amplifying channel for converting the unidirective voltage appearing at the input thereof into an alternating voltage the envelope of which varies in accordance with the magnitude of said unidirectional voltage, means in said second amplifying channel for amplifying said alternating voltage, means in said second amplifying channel for reconverting said alternating voltage into a unidirectional voltage which appears at the output of said second amplifying channel, a third capacitance connected to the output of said first amplifying channel for coupling the output therefrom to said output terminal, a third resistance connected to the output of said second amplifying channel for coupling the output therefrom to said output terminal, said resistances and capacitances being proportioned and arranged to form a pair of T networks arranged in parallel between the input and output of said system with the series resistance branch of one of said networks paralleling the series capacitance branch of the other of said networks, and the shunt capacitance branch of said first T network paralleling the shunt resistance branch of said second T network, said elements being substantially proportioned as they would be in a parallel T filter network to pass substantially uniformly with inappreciable phase shift unidirectional and alternating voltages of frequencies from zero to the rejection frequency of said filter, whereby said system amplifies uniformly said voltages without appreciably shifting the phase thereof.

References Cited in the file of this patent

UNITED STATES PATENTS

| | | |
|---|---|---|
| 2,252,612 | Bingley | Aug. 12, 1941 |
| 2,256,512 | Artzt | Sept. 23, 1941 |
| 2,495,511 | Dolberg | Jan. 24, 1950 |
| 2,564,556 | Artzt | Aug. 14, 1951 |
| 2,651,673 | Fredendall | Sept. 8, 1953 |

FOREIGN PATENTS

| | | |
|---|---|---|
| 670,801 | Great Britain | Apr. 23, 1952 |